(12) United States Patent
Lu et al.

(10) Patent No.: US 11,329,547 B2
(45) Date of Patent: May 10, 2022

(54) PRIMARY CONTROLLER APPLIED TO A PRIMARY SIDE OF A POWER CONVERTER AND OPERATIONAL METHOD THEREOF

(71) Applicant: Leadtrend Technology Corp., Hsinchu County (TW)

(72) Inventors: Hsin-Hung Lu, Hsinchu County (TW); San-Yi Li, Hsinchu County (TW)

(73) Assignee: Leadtrend Technology Corp., Hsinchu County (TW)

( * ) Notice: Subject to any disclaimer, the term of this patent is extended or adjusted under 35 U.S.C. 154(b) by 27 days.

(21) Appl. No.: 17/012,062

(22) Filed: Sep. 4, 2020

(65) Prior Publication Data

US 2021/0328500 A1 Oct. 21, 2021

(30) Foreign Application Priority Data

Apr. 17, 2020 (TW) .................................. 109112939

(51) Int. Cl.
| | |
|---|---|
| *H02M 3/158* | (2006.01) |
| *H02M 1/14* | (2006.01) |
| *H02M 1/15* | (2006.01) |
| *H02M 3/335* | (2006.01) |
| *H02M 7/219* | (2006.01) |
| *H02M 1/00* | (2006.01) |

(52) U.S. Cl.
CPC ............ *H02M 1/143* (2013.01); *H02M 1/15* (2013.01); *H02M 3/1582* (2013.01); *H02M 3/33507* (2013.01); *H02M 7/219* (2013.01); *H02M 1/0016* (2021.05)

(58) Field of Classification Search
CPC ............ H02M 3/22; H02M 1/08; H02M 1/36; H02M 3/24; H02M 3/325; H02M 3/335; H02M 3/28; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; Y02B 70/1491
See application file for complete search history.

(56) References Cited

U.S. PATENT DOCUMENTS

| | | | |
|---|---|---|---|
| 9,954,445 B2* | 4/2018 | Gritti | H02M 3/33507 |
| 9,998,012 B2* | 6/2018 | Xu | H02M 3/33507 |
| 11,128,211 B2* | 9/2021 | Feldtkeller | H02M 1/083 |

(Continued)

*Primary Examiner* — Thienvu V Tran
*Assistant Examiner* — Nusrat Quddus
(74) *Attorney, Agent, or Firm* — Winston Hsu

(57) ABSTRACT

A primary controller applied to a primary side of a power converter includes a ripple cancellation circuit, a compensation voltage generation circuit, and a gate control signal generation circuit. The ripple cancellation circuit generates an adjustment according to a current flowing through a feedback pin of the primary controller during turning-on of a power switch of the primary side of the power converter. The compensation voltage generation circuit generates a compensation voltage of a compensation pin of the primary controller according to the adjustment, a reference voltage, and a feedback voltage of the feedback pin. The gate control signal generation circuit generates a gate control signal to the power switch to reduce an output voltage of a secondary side of the power converter according to the compensation voltage and a detection voltage.

17 Claims, 9 Drawing Sheets

(56) References Cited

U.S. PATENT DOCUMENTS

| | | | | |
|---|---|---|---|---|
| 2010/0002480 A1* | 1/2010 | Huynh | ............... | H02M 3/335 |
| | | | | 363/90 |
| 2012/0243269 A1* | 9/2012 | Ren | ............... | H02M 3/33507 |
| | | | | 363/21.12 |
| 2012/0250367 A1* | 10/2012 | Desimone | ............ | H02M 1/44 |
| | | | | 363/21.17 |
| 2014/0307485 A1* | 10/2014 | Xu | ............... | H02M 3/33515 |
| | | | | 363/21.13 |
| 2015/0381054 A1* | 12/2015 | Chang | ............ | H02M 1/4258 |
| | | | | 315/294 |
| 2016/0190938 A1* | 6/2016 | Wang | ............ | H02M 3/33507 |
| | | | | 363/21.12 |
| 2017/0040901 A1* | 2/2017 | Tumminaro | ......... | H02M 1/08 |
| 2017/0133939 A1* | 5/2017 | Zhang | ............ | H02M 3/33507 |
| 2018/0234013 A1* | 8/2018 | Lu | ..................... | H02M 3/156 |
| 2019/0036458 A1* | 1/2019 | Shen | .................... | H02M 1/08 |
| 2020/0382005 A1* | 12/2020 | Feldtkeller | ............ | H02M 1/32 |
| 2021/0013809 A1* | 1/2021 | Chen | ............... | H02M 3/33523 |

\* cited by examiner

------- output voltage Vout before compensation
——— output voltage Vout after compensation

PRIMARY CONTROLLER APPLIED TO A PRIMARY SIDE OF A POWER CONVERTER AND OPERATIONAL METHOD THEREOF

BACKGROUND OF THE INVENTION

1. Field of the Invention

The present invention relates to a primary controller applied to a primary side of a power converter and an operational method thereof, and particularly to when a power converter operates in a quasi-resonant mode, or a continuous-conduction mode, or a discontinuous-conduction mode, a primary controller and an operational method thereof that can suppress ripples of an output voltage of a secondary side of the power converter under a direct current voltage of the primary side of the power converter being gradually reduced and a load of the secondary side of the power converter being very large.

2. Description of the Prior Art

An input voltage of a primary side of a power converter is rectified by a bridge rectifier of the primary side of the power converter to generate a direct current (DC) voltage VBUCK, wherein the DC voltage VBUCK will be changed with the input voltage. Therefore, when the input voltage is close to a valley, the DC voltage VBUCK is gradually decreased (as shown in FIG. 1). In addition, a primary controller applied to the primary side of the power converter can sample a feedback voltage VFB of a feedback pin during a discharge time of a secondary side of the power converter to control an output voltage VOUT of the secondary side of the power converter, wherein the feedback voltage VFB is generated by an auxiliary voltage of an auxiliary winding being divided by resistors. If a load of the secondary side of the power converter is very large and the power converter operates in a quasi-resonant mode, the output voltage VOUT will be decreased because energy provided by the primary side of the power converter is insufficient, resulting in the primary controller increasing a turning-on time of a power switch of the primary side of the power converter to increase the output voltage VOUT. As shown in FIG. 1, increase of the turning-on time not only makes a detection voltage VCS of the primary side of the power converter be increased, but also makes the discharge time of the secondary side of the power converter be increased after the power switch is turned off. Both the turning-on time and the discharge time are increased, so an operating frequency of the power converter is decreased. Meanwhile, the power converter needs to increase the turning-on time to increase the output voltage VOUT by continuously increasing a compensation voltage VCOMP, but the operating frequency becomes slower because both the turning-on time and the discharge time are increased, resulting in a feedback controlling speed of the power converter being limited to make ripples of the output voltage VOUT be too large to meet a specification of the power converter.

Therefore, how to suppress the ripples of the output voltage VOUT under the DC voltage VBUCK being gradually decreased and the load of the secondary side of the power converter being very large becomes an important issue of a designer of the primary controller.

SUMMARY OF THE INVENTION

An embodiment of the present invention provides a primary controller applied to a primary side of a power converter, wherein the primary controller includes a ripple cancellation function. The primary controller includes a ripple cancellation circuit, a compensation voltage generation circuit, and a gate control signal generation circuit. The ripple cancellation circuit is for generating an adjustment according to a current flowing through a feedback pin of the primary controller during turning-on of a power switch of the primary side of the power converter. The compensation voltage generation circuit is coupled to the ripple cancellation circuit, the feedback pin, and a compensation pin of the primary controller for generating a compensation voltage of the compensation pin according to the adjustment, a reference voltage, and a feedback voltage of the feedback pin. The gate control signal generation circuit is coupled to the compensation voltage generation circuit and the compensation pin for generating a gate control signal to the power switch to reduce an output voltage of a secondary side of the power converter according to the compensation voltage and a detection voltage.

Another embodiment of the present invention provides an operational method applied to a primary controller of a primary side of a power converter, wherein the primary controller includes a ripple cancellation circuit, a compensation voltage generation circuit, and a gate control signal generation circuit, and has a ripple cancellation function. The operational method includes the ripple cancellation circuit generating an adjustment according to a current flowing through a feedback pin of the primary controller during turning-on of a power switch of the primary side of the power converter; the compensation voltage generation circuit generating a compensation voltage of a compensation pin according to the adjustment, a reference voltage, and a feedback voltage of the feedback pin; and the gate control signal generation circuit generating a gate control signal to the power switch to reduce an output voltage of a secondary side of the power converter according to the compensation voltage and a detection voltage.

The present invention provides a primary controller applied to a primary side of a power converter and an operational method thereof. The primary controller and the operational method utilize a ripple cancellation circuit of the primary controller to generate an adjustment according to a current flowing through a feedback pin of the primary controller during turning-on of a power switch of the primary side of the power converter when an input voltage of the primary side of the power converter is greater than a ripple cancellation reference voltage, utilize a compensation voltage generation circuit of the primary controller to generate a compensation voltage of a compensation pin according to the adjustment, a reference voltage, and a feedback voltage of the feedback pin, and utilize a gate control signal generation circuit of the primary controller to generate a generate gate control signal to the power switch according to the compensation voltage and a detection voltage to reduce an output voltage of a secondary side of the power converter. Therefore, compared to the prior art, when the power converter operates in a quasi-resonant mode, or a continuous-conduction mode, or a discontinuous-conduction mode, the present invention can suppress ripples of the output voltage of the secondary side of the power converter under a DC voltage of the primary side of the power converter being gradually decreased and a load of the secondary side of the power converter being very large.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
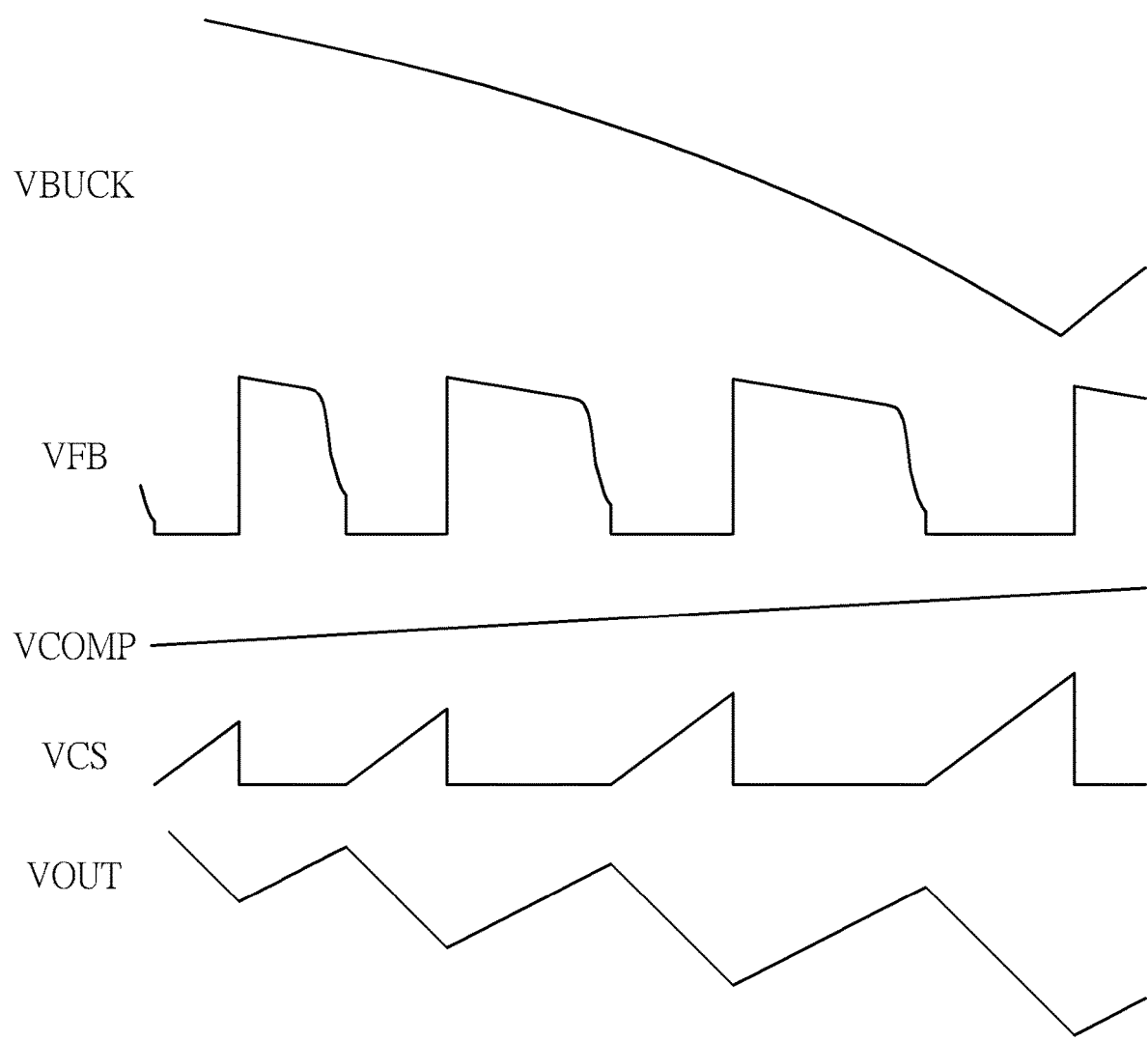
FIG. 1 is a timing diagram illustrating a DC voltage, a feedback voltage, a compensation voltage, and a detection voltage of a primary side of the power converter and an output voltage of a secondary side of the power converter.
Figure 2:
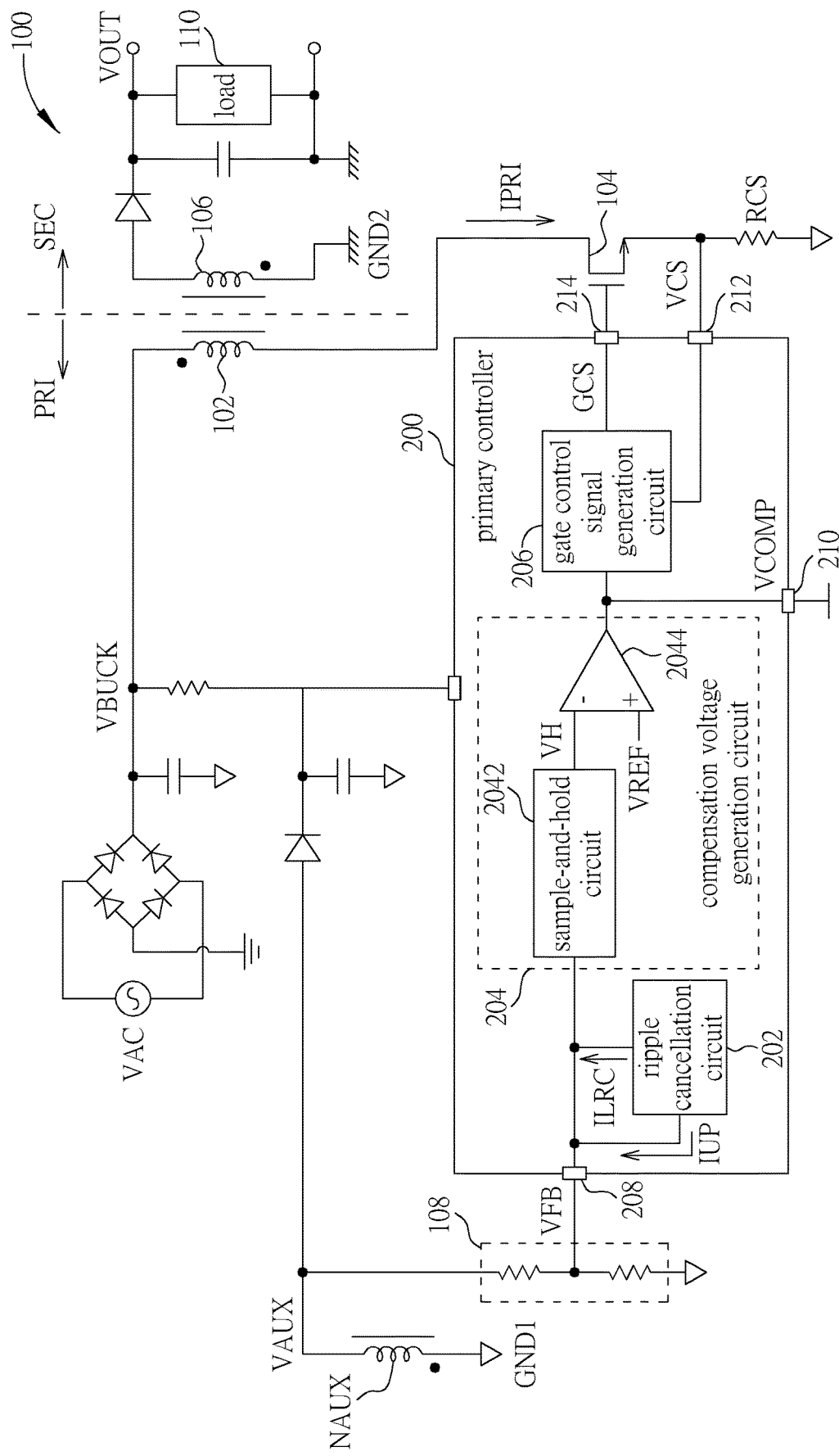
FIG. 2 is a diagram illustrating a primary controller applied to a primary side of a power converter according to a first embodiment of the present invention.

Please refer to FIG. 2. FIG. 2 is a diagram illustrating a primary controller 200 applied to a primary side PRI of a power converter 100 according to a first embodiment of the present invention, wherein the primary controller 200 includes a ripple cancellation function. The primary controller 200 includes a ripple cancellation circuit 202, a compensation voltage generation circuit 204, and a gate control signal generation circuit 206, potential of ground GND1 of the primary side PRI of the power converter 100 are not necessarily equal to potential of ground GND2 of a secondary side SEC of the power converter 100, and the converter 100 is a flyback power converter. In addition, the power converter 100 can operate in a quasi-resonant mode (QRM), or a continuous-conduction mode (CCM), or a discontinuous-conduction mode (DCM). As shown in FIG. 2, the ripple cancellation circuit 202 is coupled to a feedback pin 208 of the primary controller 200, and the compensation voltage generation circuit 204 is coupled to the ripple cancellation circuit 202, the feedback pin 208, and a compensation pin 210 of the primary controller 200, and the gate control signal generation circuit 206 is coupled to the compensation voltage generation circuit 204 and the compensation pin 210. In addition, the compensation voltage generation circuit 204 includes a sample-and-hold circuit 2042 and an error amplifier 2044, wherein the sample-and-hold circuit 2042 is coupled to the ripple cancellation circuit 202 and the feedback pin 208, and the error amplifier 2044 is coupled to the sample-and-hold circuit 2042 and the compensation pin 210. As shown in FIG. 2, a primary side winding 102 of the primary side PRI of the power converter 100 and an auxiliary winding NAUX of the primary side PRI of the power converter 100 form a transformer, so the auxiliary winding NAUX can be used for storing energy when a power switch 104 of the primary side PRI of the power converter 100 is turned on. That is to say, an auxiliary voltage VAUX of the auxiliary winding NAUX corresponds to an output voltage VOUT of the secondary side SEC of the power converter 100 (because the primary side winding 102 and a secondary side winding 106 of the secondary side SEC of the power converter 100 form another transformer). Therefore, as shown in FIG. 2, the primary controller 200 can use a feedback voltage VFB of the feedback pin 208 to detect the output voltage VOUT and further use the feedback voltage VFB and a detection voltage VCS to control the output voltage VOUT, wherein the feedback pin 208 is coupled to a voltage divider 108, and the feedback voltage VFB is generated by the auxiliary voltage VAUX being divided by the voltage divider 108. The detection voltage VCS is determined by a primary side current IPRI flowing through the power switch 104 of the primary side PRI of the power converter 100 and a detection resistor RCS, and the detection resistor RCS is coupled to the power switch 104.

Figure 3:
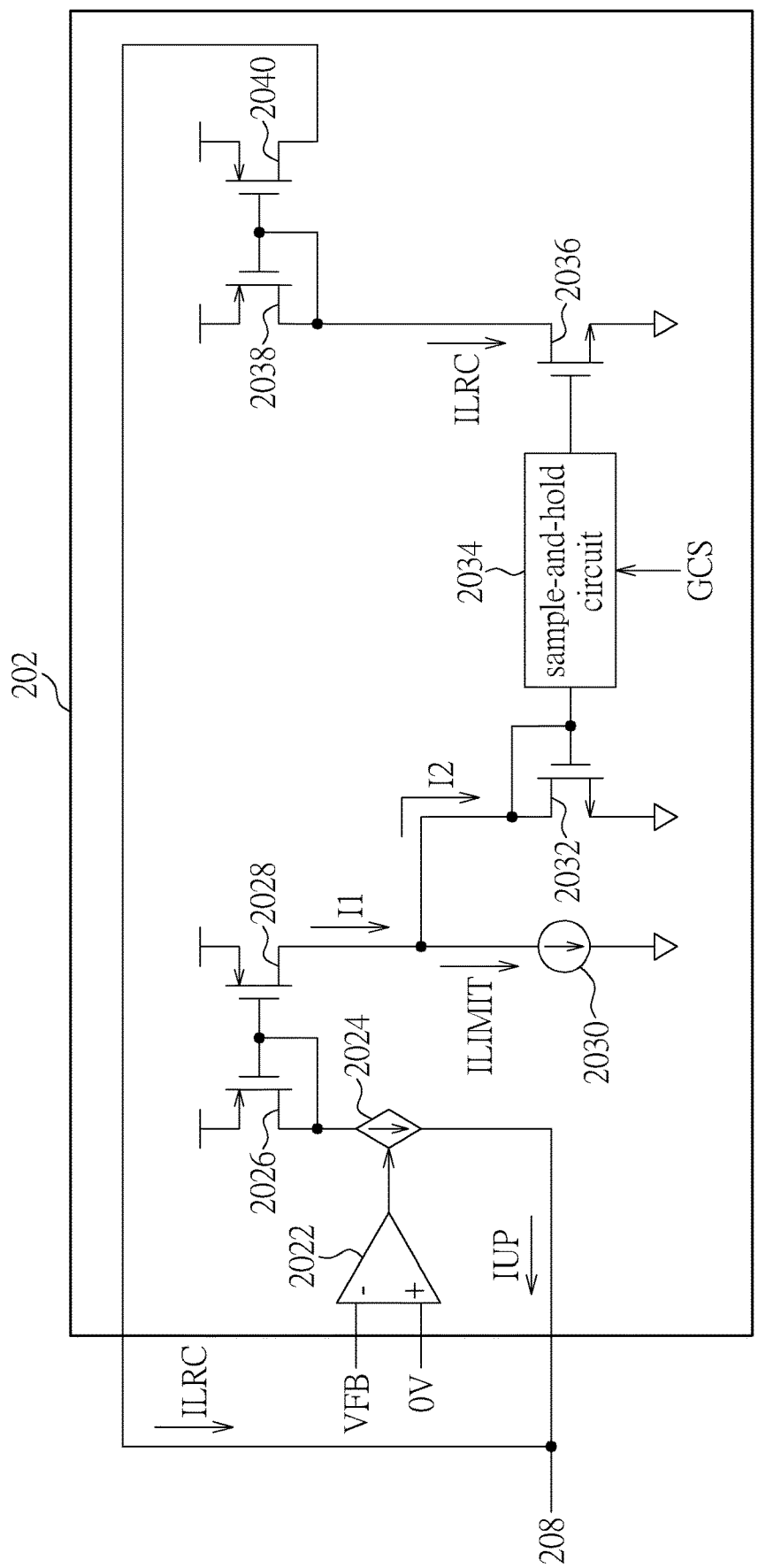
FIG. 3 is a diagram illustrating a ripple cancellation circuit.
Figure 4:
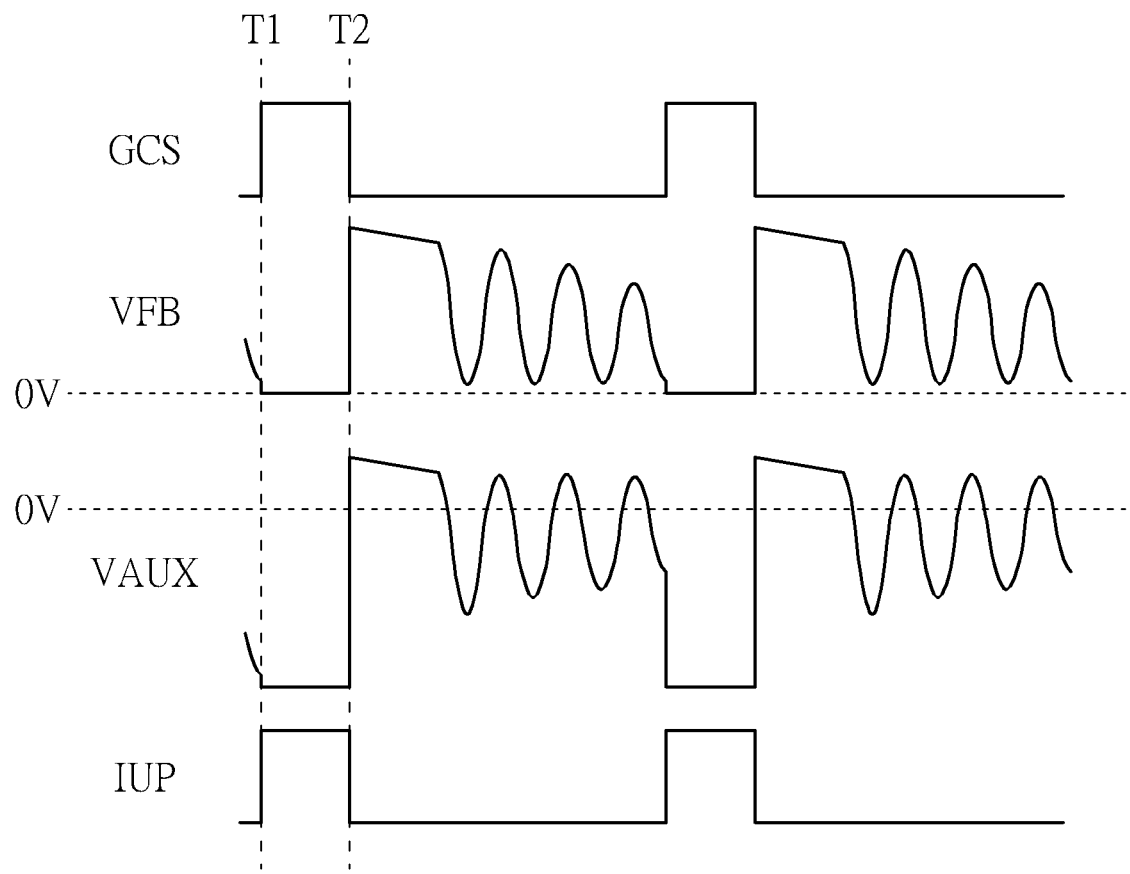
FIG. 4 is a timing diagram illustrating a gate control signal, a feedback voltage, an auxiliary voltage, and a current flowing through a feedback pin of the primary controller.

Please refer to FIG. 3, 4. FIG. 3 is a diagram illustrating the ripple cancellation circuit 202, and FIG. 4 is a timing diagram illustrating a gate control signal GCS, the feedback voltage VFB, the auxiliary voltage VAUX, and a current IUP flowing through the feedback pin 208 of the primary controller 200. As shown in FIG. 3, the ripple cancellation circuit 202 includes an error amplifier 2022, a first current source 2024, a first P-type metal-oxide-semiconductor transistor 2026, a second P-type metal-oxide-semiconductor transistor 2028, a second current source 2030, a first N-type metal-oxide-semiconductor transistor 2032, a sample-and-hold circuit 2034, a second N-type metal-oxide-semiconductor transistor 2036, a third P-type metal-oxide-semiconductor transistor 2038, and a forth P-type metal-oxide-semiconductor transistor 2040, wherein coupling relationships between the error amplifier 2022, the first current source 2024, the first P-type metal-oxide-semiconductor transistor 2026, the second P-type metal-oxide-semiconductor transistor 2028, the second current source 2030, the first N-type metal-oxide-semiconductor transistor 2032, the sample-and-hold circuit 2034, the second N-type metal-oxide-semiconductor transistor 2036, the third P-type metal-oxide-semiconductor transistor 2038, and the forth P-type metal-oxide-semiconductor transistor 2040 can be referred to FIG. 3, so further description thereof is omitted for simplicity. In addition, as shown in FIG. 4, when the power switch 104 is turned on (between a time period T1 and a time period T2), the auxiliary voltage VAUX is inverse to a direct current (DC) voltage VBUCK (the primary side winding 102 and the auxiliary winding NAUX form the transformer, so the auxiliary voltage VAUX is a negative voltage), wherein as shown in FIG. 2, one of ordinary skill in the art should know the auxiliary voltage VAUX corresponds to the DC voltage VBUCK and a turns ratio, the DC voltage VBUCK is generated by an input voltage VAC (an alternating current (AC) voltage) of the primary side PRI of the power converter 100 being rectified by a bridge rectifier of the primary side PRI of the power converter 100, and the turns ratio is a ratio of turns of the primary side winding 102 to turns of the auxiliary winding NAUX. In addition, please refer to FIGS. 2, 3. When the power switch 104 is turned on and the feedback voltage VFB is less than 0, the error amplifier 2022 starts to make the first current source 2024 generate the current IUP, wherein the current IUP can make the feedback voltage VFB be clamped at 0V, and the auxiliary voltage VAUX is less than 0, so the current IUP will flow out the primary controller 200 to the auxiliary winding NAUX through the feedback pin 208. In addition, as shown in FIG. 2, the current IUP corresponds to the auxiliary voltage VAUX and the feedback voltage VFB. In addition, because the current IUP corresponds to the auxiliary voltage VAUX and the feedback voltage VFB, the auxiliary voltage VAUX corresponds to the DC voltage VBUCK and the turns ratio, the feedback voltage VFB is clamped at 0V, and the turns ratio is a constant, the current IUP can be positively changed with the DC voltage VBUCK, that is to say, the current IUP is increased with increase of the DC voltage VBUCK, and the current IUP is decreased with decrease of the DC voltage VBUCK.

Figure 5:
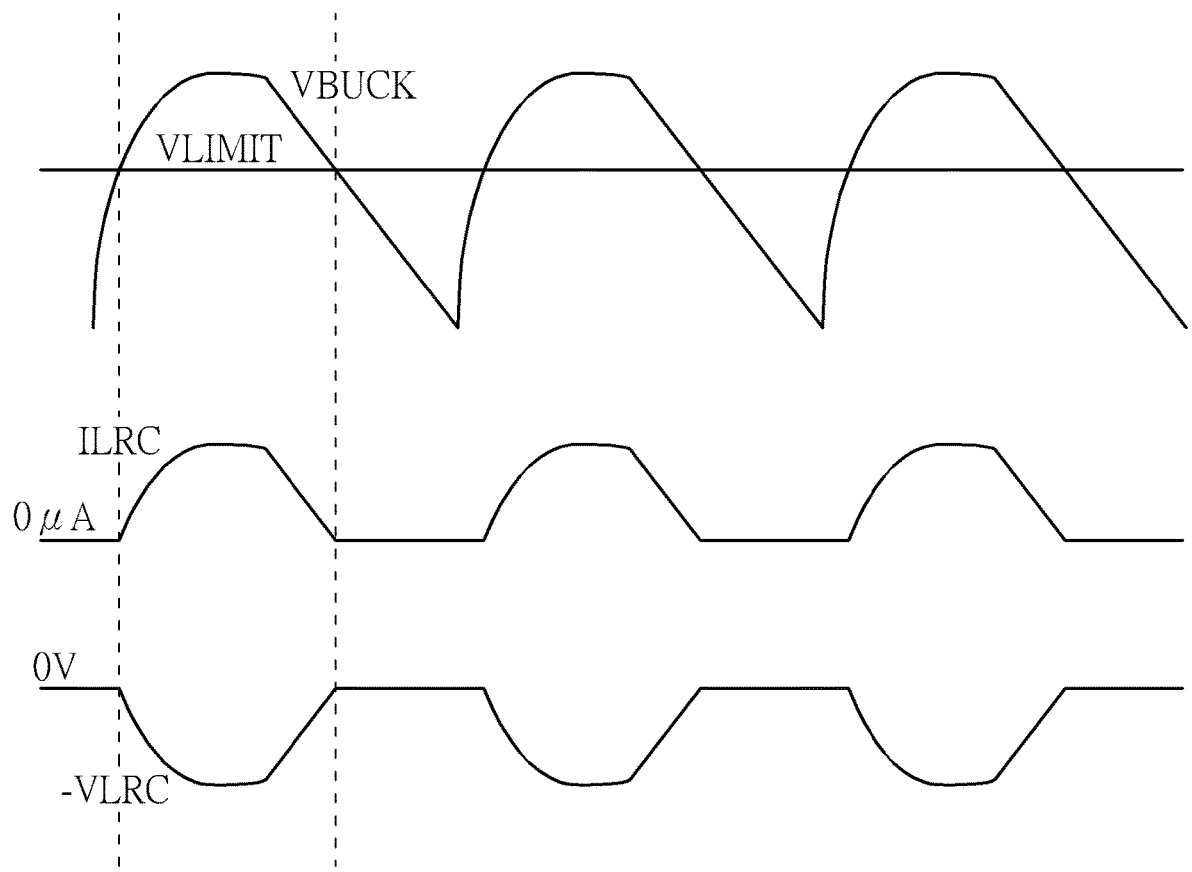
FIG. 5 is a timing diagram illustrating a DC voltage, a ripple cancellation reference voltage, a regulation current, and a regulation voltage.

In addition, as shown in FIG. 3, the first P-type metal-oxide-semiconductor transistor 2026 and the second P-type metal-oxide-semiconductor transistor 2028 form a first current mirror, wherein a first ratio of an aspect ratio of the first P-type metal-oxide-semiconductor transistor 2026 to an aspect ratio of the second P-type metal-oxide-semiconductor transistor 2028 is K, and K is greater than 1. However, the present invention is not limited to the first ratio being K. In addition, as shown in FIG. 3, the first N-type metal-oxide-semiconductor transistor 2032 and the second N-type metal-oxide-semiconductor transistor 2036 form a second current mirror, wherein an aspect ratio of the first N-type metal-oxide-semiconductor transistor 2032 is equal to an aspect ratio of the second N-type metal-oxide-semiconductor transistor 2036. However, the present invention is not limited to the aspect ratio of the first N-type metal-oxide-semiconductor transistor 2032 being equal to the aspect ratio of the second N-type metal-oxide-semiconductor transistor 2036. In addition, as shown in FIG. 3, the third P-type metal-oxide-semiconductor transistor 2038 and the forth P-type metal-oxide-semiconductor transistor 2040 form a third current mirror, wherein an aspect ratio of the third P-type metal-oxide-semiconductor transistor 2038 is equal to an aspect ratio of the second the forth P-type metal-oxide-semiconductor transistor 2040. However, the present invention is not limited to the aspect ratio of the third P-type metal-oxide-semiconductor transistor 2038 being equal to the aspect ratio of the second the forth P-type metal-oxide-semiconductor transistor 2040. In addition, a limiting current ILIMIT provided by the second current source 2030 is determined by a ripple cancellation reference voltage VLIMIT. Therefore, during turning-on of the power switch 104 of the primary side PRI of the power converter 100, the error amplifier 2022 can make the first current source 2024 generate the current IUP, and the first current mirror can generate a first current I1 according to the current IUP and the first ratio (wherein the first current I1 is equal to a current IUP/K), wherein the current IUP is positively changed with the DC voltage VBUCK, so the first current I1 is also positively changed with the DC voltage VBUCK. Because the limiting current ILIMIT is determined by the ripple cancellation reference voltage VLIMIT, and the first current I1 is positively changed with the DC voltage VBUCK, when the DC voltage VBUCK is greater than the ripple cancellation reference voltage VLIMIT, a second current I2 will flow into the second current mirror, wherein the second current I2 is equal to the first current I1 minus the limiting current ILIMIT. In addition, because the gate control signal GCS is enabled during the turning-on of the power switch 104 of the primary side PRI of the power converter 100, the sample-and-hold circuit 2034 can make the second current mirror operate normally according to the control signal GCS, that is to say, the second current mirror can generate a regulation current ILRC (that is, an adjustment) according to the second current I2, wherein because the aspect ratio of the first N-type metal-oxide-semiconductor transistor 2032 is equal to the aspect ratio of the second N-type metal-oxide-semiconductor transistor 2036, the regulation current ILRC is equal to the second current I2, and relationships between the regulation current ILRC, the DC voltage VBUCK, and the ripple cancellation reference voltage VLIMIT can be referred to FIG. 5. In addition, as shown in FIG. 5, when the DC voltage VBUCK is greater than the ripple cancellation reference voltage VLIMIT, the regulation current ILRC is positively changed with the DC voltage VBUCK. In addition, as show in FIG. 3, the third current mirror can make the regulation current ILRC flow to the feedback pin 208, resulting in the feedback voltage VFB of the feedback pin 208 being increased.

In addition, as shown in FIG. 2, when the feedback voltage VFB is increased, a sample voltage VH generated by the sample-and-hold circuit 2042 sampling the feedback voltage VFB is also increased; because the sample voltage VH is increased, a compensation voltage VCOMP of the compensation pin 210 generated by the error amplifier 2044 according to a reference voltage VREF and the sample voltage VH can be decreased.

Figure 6:
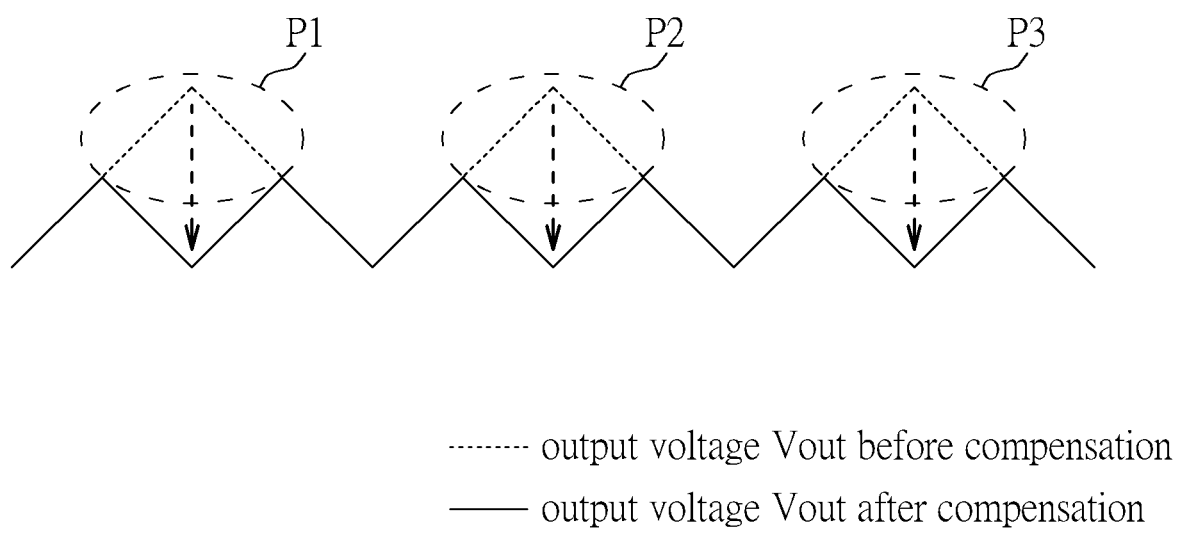
FIG. 6 is a diagram illustrating ripples of an output voltage being reduced.

In addition, as shown in FIG. 2, the gate control signal generation circuit 206 can generate the gate control signal GCS to the power switch 104 according to the compensation voltage VCOMP and the detection voltage VCS, wherein the gate control signal generation circuit 206 receives the detection voltage VCS through a pin 212 and transmits the gate control signal GCS to the power switch 104 through a pin 214. Because the compensation voltage VCOMP is decreased, a turning-on time of the gate control signal GCS generated by the gate control signal generation circuit 206 is decreased (that is to say, a duty cycle of the gate control signal GCS is decreased), resulting in the output voltage VOUT of the secondary side SEC of the power converter 100 being decreased. That is to say, as shown in FIG. 2, when the DC voltage VBUCK is greater than the ripple cancellation reference voltage VLIMIT, the ripple cancellation circuit 202 can generate the regulation current ILRC to make the feedback voltage VFB of the feedback pin 208 be increased, so the compensation voltage VCOMP generated by the compensation voltage generation circuit 204 is decreased, resulting in the turning-on time of the gate control signal GCS generated by the gate control signal generation circuit 206 being decreased to reduce the output voltage VOUT of the secondary side SEC of the power converter 100. In addition, because when the DC voltage VBUCK is greater than the ripple cancellation reference voltage VLIMIT, the output voltage VOUT is reduced, as shown in FIG. 6, peak areas P1-P3 (corresponding to the DC voltage VBUCK being greater than the ripple cancellation reference voltage VLIMIT) before the output voltage VOUT is compensated will be reduced, resulting in ripples of the output voltage VOUT being reduced. Therefore, the primary controller 200 can use the ripple cancellation function to suppress the ripples of the output voltage VOUT when the DC voltage VBUCK is gradually decreased and a load 110 of the secondary side SEC of the power converter 100 is very large.

Figure 7:
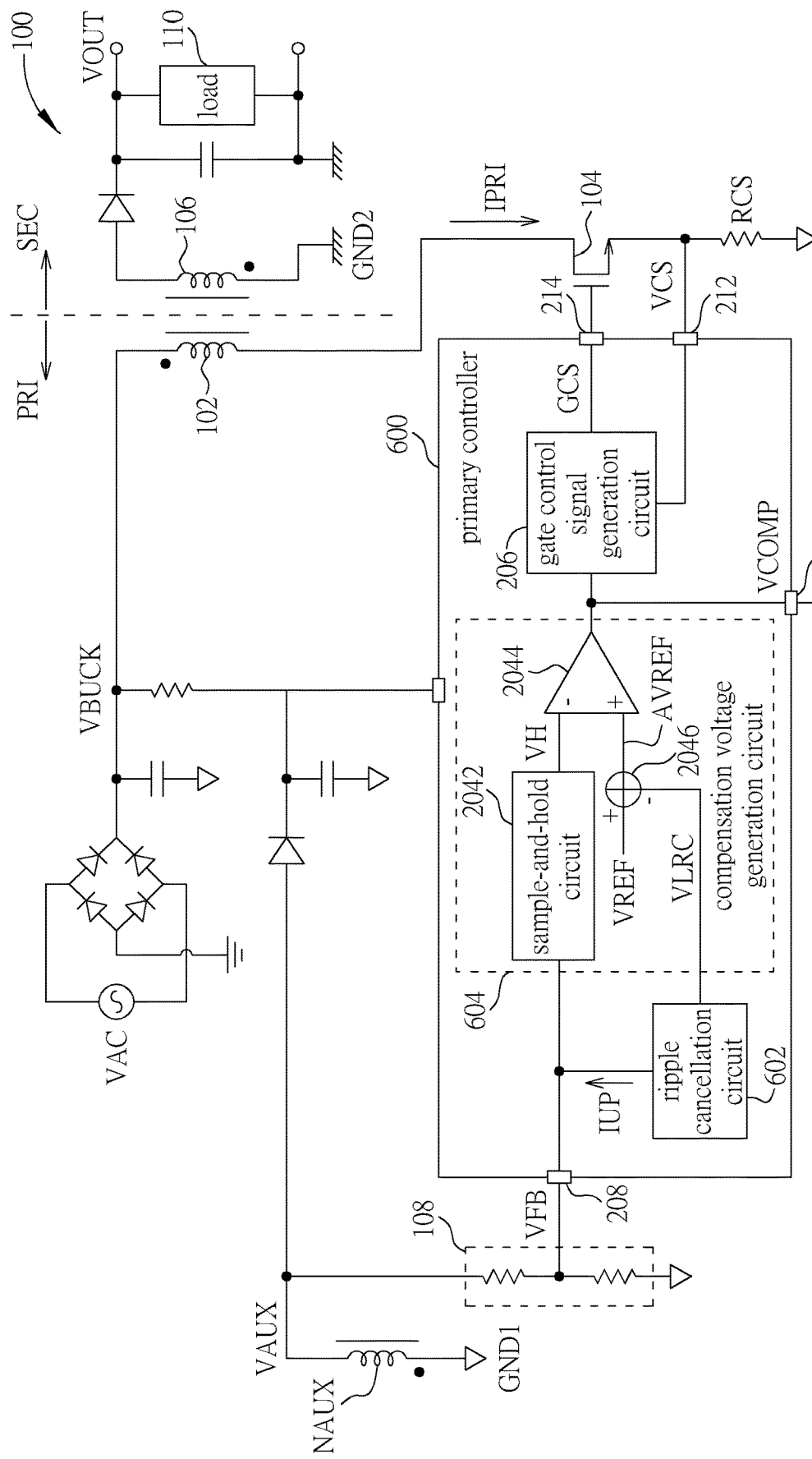
FIG. 7 is a diagram illustrating a primary controller applied to the primary side of the power converter according to another embodiment of the present invention.
Figure 8:
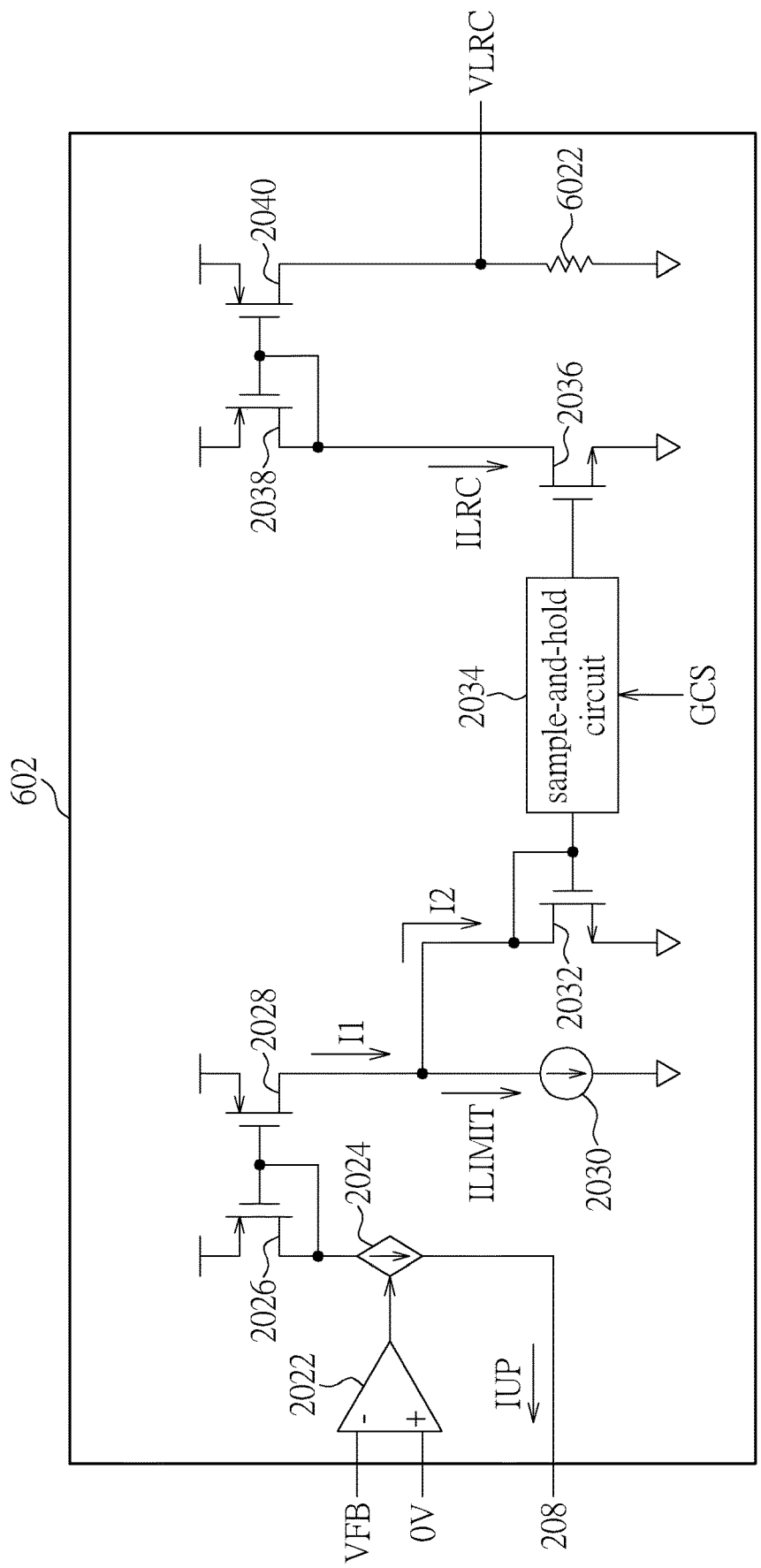
FIG. 8 is a diagram illustrating the ripple cancellation circuit of the primary controller.

In addition, please refer to FIG. 7, 8. FIG. 7 is a diagram illustrating a primary controller 600 applied to the primary side PRI of the power converter 100 according to another embodiment of the present invention, and FIG. 8 is a diagram illustrating a ripple cancellation circuit 602 of the primary controller 600, wherein differences between the primary controller 600 and the primary controller 200 are that the ripple cancellation circuit 602 is different from the ripple cancellation circuit 202, and a compensation voltage generation circuit 604 of the primary controller 600 is different from the compensation voltage generation circuit 204. In addition, coupling relationships between the ripple cancellation circuit 602, the compensation voltage generation circuit 604, and the gate control signal generation circuit 206 can be referred to FIG. 7, so further description thereof is omitted for simplicity. As shown in FIG. 8, a difference between the ripple cancellation circuit 602 and the ripple cancellation circuit 202 is that the ripple cancellation circuit 602 includes a resistor 6022, wherein the resistor 6022 and the regulation current ILRC can determine a regulation voltage VLRC (that is, the adjustment). In addition, as shown in FIG. 5, when the DC voltage VBUCK is greater than the ripple cancellation reference voltage VLIMIT, the regulation current ILRC is positively changed with the DC voltage VBUCK, and the resistor 6022 and the regulation current ILRC can determine the regulation voltage VLRC, so the regulation voltage VLRC is also positively changed with the DC voltage VBUCK. In addition, as shown in FIG. 7, an adder 2046 of the compensation voltage generation circuit 604 can generate an adjusted reference voltage AVREF according to the regulation voltage VLRC and the reference voltage VREF, wherein the adjusted reference voltage AVREF is equal to the reference voltage VREF minus the regulation voltage VLRC. That is to say, the adjusted reference voltage AVREF is less than the reference voltage VREF. Because the adjusted reference voltage AVREF is less than the reference voltage VREF, the compensation voltage VCOMP generated by the error amplifier 2044 according to the adjusted reference voltage AVREF and the sample voltage VH can be decreased.

In addition, as shown in FIG. 7, because the compensation voltage VCOMP is decreased, the turning-on time of the gate control signal GCS generated by the gate control signal generation circuit 206 is decreased (that is, the duty cycle of the gate control signal GCS is decreased), resulting in the output voltage VOUT of the secondary side SEC of the power converter 100 being decreased. That is to say, as shown in FIG. 7, when the DC voltage VBUCK is greater than the reference voltage VLIMIT, the ripple cancellation circuit 602 can generate the regulation voltage VLRC according to the regulation current ILRC to make the error amplifier 2044 receive a smaller reference voltage (that is, the adjusted reference voltage AVREF), so the compensation voltage VCOMP generated by the compensation voltage generation circuit 604 can be decreased, resulting in the turning-on time of the gate control signal GCS generated by gate control signal generation circuit 206 being decreased to reduce the output voltage VOUT of the secondary side SEC of the power converter 100. In addition, subsequent operational principles of the primary controller 600 are the same as those of the primary controller 200, so further description thereof is omitted for simplicity.

Figure 9:
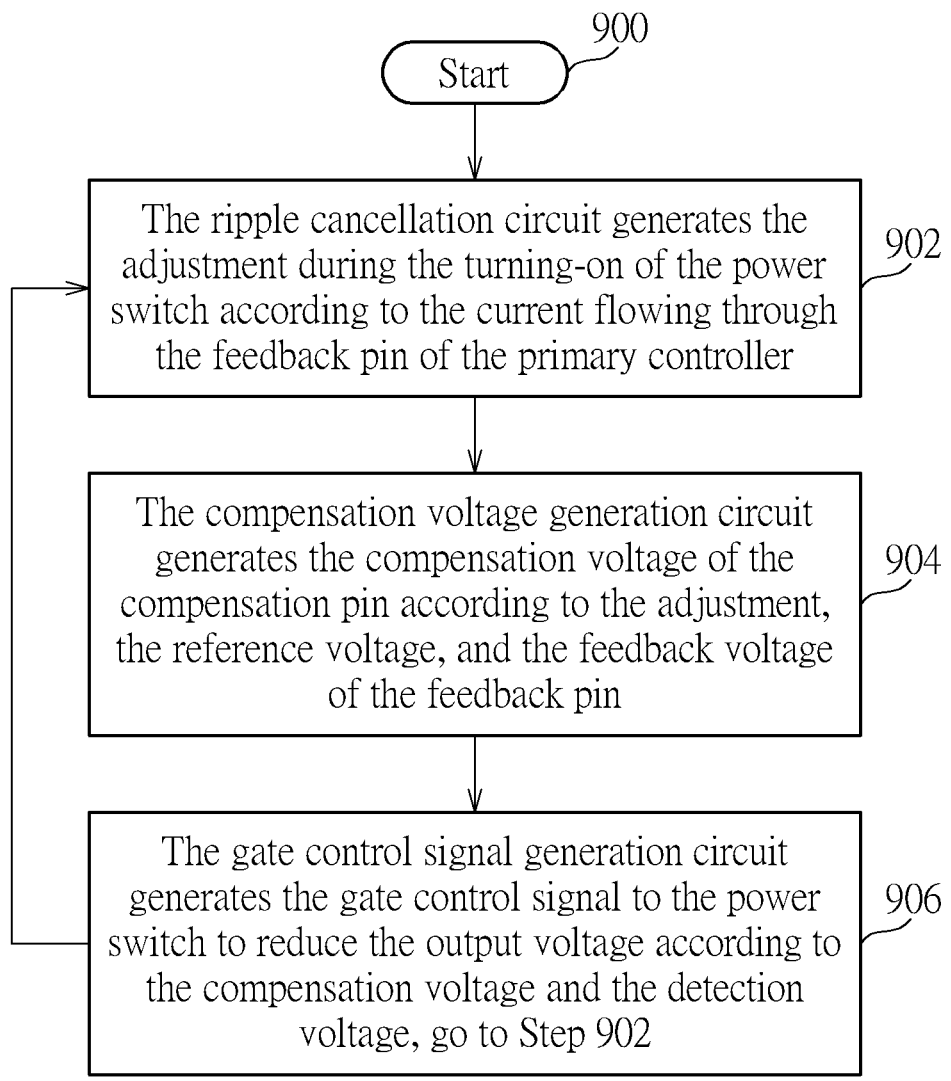
FIG. 9 is a flowchart illustrating an operational method applied to a primary controller of a primary side of a power converter according to a second embodiment of the present invention.

In addition, please refer to FIGS. 2, 3, 5-9. FIG. 9 is a flowchart illustrating an operational method applied to a primary controller of a primary side of a power converter according to a second embodiment of the present invention. The operational method of FIG. 9 is illustrated using the power converter 100 and the primary controller 200 in FIG. 2, the ripple cancellation circuit 202 in FIG. 3, the DC voltage VBUCK, the regulation current ILRC, and the regulation voltage VLRC in FIG. 5, the output voltage VOUT in FIG. 6, the primary controller 600 in FIG. 7, and the ripple cancellation circuit 602 in FIG. 8. Detailed steps are as follows:

Step 900: Start.

Step 902: The ripple cancellation circuit 202 generates the adjustment during the turning-on of the power switch 104 according to the current IUP flowing through the feedback pin 208 of the primary controller 200.

Step 904: The compensation voltage generation circuit 204 generates the compensation voltage VCOMP of the compensation pin 210 according to the adjustment, the reference voltage VREF, and the feedback voltage VFB of the feedback pin 208.

Step 906: The gate control signal generation circuit 206 generates the gate control signal GCS to the power switch 104 to reduce the output voltage VOUT according to the compensation voltage VCOMP and the detection voltage VCS, go to Step 902.

In Step 902, please refer to FIGS. 2, 3. When the power switch 104 is turned on and the feedback voltage VFB is less than 0, the error amplifier 2022 starts to make the first current source 2024 generate the current IUP, wherein the current IUP can make the feedback voltage VFB be clamped at 0V, and because the auxiliary voltage VAUX is less than 0, the current IUP will flow out the primary controller 200 to the auxiliary winding NAUX through the feedback pin 208. In addition, as shown in FIG. 2, the current IUP corresponds to the auxiliary voltage VAUX and the feedback voltage VFB. In addition, because the current IUP corresponds to the auxiliary voltage VAUX and the feedback voltage VFB, the auxiliary voltage VAUX corresponds to the DC voltage VBUCK and the turns ratio, the feedback voltage VFB is clamped at 0V, and the turns ratio is the constant, the current IUP can be positively changed with the DC voltage VBUCK, that is to say, the current IUP is increased with the increase of the DC voltage VBUCK, and the current IUP is decreased with the decrease of the DC voltage VBUCK. Therefore, as shown in FIG. 3, during the turning-on of the power switch 104 of the primary side PRI of the power converter 100, the error amplifier 2022 can make the first current source 2024 generate the current IUP, and the first mirror can generate the first current I1 according to the current IUP and the first ratio (wherein the first current I1 is equal to the current IUP/K), wherein the current IUP is positively changed with the DC voltage VBUCK, so the first current I1 is also positively changed with the DC voltage VBUCK. Because the limiting current ILIMIT is determined by the ripple cancellation reference voltage VLIMIT, and the first current I1 is positively changed with the DC voltage VBUCK, when the DC voltage VBUCK is greater than the ripple cancellation reference voltage VLIMIT, the second current I2 will flow into the second current mirror, wherein the second current I2 is equal to the first current I1 minus the limiting current ILIMIT. In addition, because the gate control signal GCS is enabled during the turning-on of the power switch 104 of the primary side PRI of the power converter 100, the sample-and-hold circuit 2034 can make the second current mirror normally operate according to the gate control signal GCS, that is to say, the second current mirror can generate the regulation current ILRC (that is, the adjustment) according to the second current I2, wherein because the aspect ratio of first N-type metal-oxide-semiconductor transistor 2032 is equal to the aspect ratio of the second N-type metal-oxide-semiconductor transistor 2036, the regulation current ILRC is equal to the second current I2, and the relationships between the regulation current ILRC, the DC voltage VBUCK, and the ripple cancellation reference voltage VLIMIT can be referred to FIG. 5. In addition, as shown in FIG. 5, when the DC voltage VBUCK is greater than the ripple cancellation reference voltage VLIMIT, the regulation current ILRC is positively changed with the DC voltage VBUCK. In addition, as show in FIG. 3, the third current mirror can make regulation current ILRC flow to the feedback pin 208, resulting in the feedback voltage VFB of the feedback pin 208 being increased.

In Step 904, as shown in FIG. 2, when the feedback voltage VFB is increased, the sample voltage VH generated by the sample-and-hold circuit 2042 sampling the feedback voltage VFB is also increased; because the sample voltage VH is increased, the compensation voltage VCOMP of the compensation pin 210 generated by the error amplifier 2044 according to the reference voltage VREF and the sample voltage VH can be decreased.

In Step 906, as shown in FIG. 2, the gate control signal generation circuit 206 can generate the gate control signal GCS to the power switch 104 according to the compensation voltage VCOMP and the detection voltage VCS. Because the compensation voltage VCOMP is decreased, the turning-on time of the gate control signal GCS generated by the gate control signal generation circuit 206 is decreased (that is, the duty cycle of the gate control signal GCS is decreased), resulting in the output voltage VOUT of the secondary side SEC of the power converter 100 being decreased. That is to say, as shown in FIG. 2, when the DC voltage VBUCK is greater than the ripple cancellation reference voltage VLIMIT, the ripple cancellation circuit 202 can generate the regulation current ILRC to make the feedback voltage VFB of the feedback pin 208 be increased, so the compensation voltage VCOMP generated by the compensation voltage generation circuit 204 is decreased, resulting in the turning-on time of the gate control signal GCS generated by the gate control signal generation circuit 206 being decreased to reduce the output voltage VOUT of the secondary side SEC of the power converter 100. In addition, because when the DC voltage VBUCK is greater than the ripple cancellation reference voltage VLIMIT, the output voltage VOUT is reduced, as shown in FIG. 6, the peak areas P1-P3 (corresponding to the DC voltage VBUCK is greater than the ripple cancellation reference voltage VLIMIT) before the output voltage VOUT is compensated will be reduced, resulting in the ripples of the output voltage VOUT being reduced. Therefore, the primary controller 200 can use the ripple cancellation function to suppress the ripples of the output voltage VOUT, when the DC voltage VBUCK is gradually decreased and the load 110 of the side SEC of the power converter 100 is very large.

In addition, in another embodiment of the present invention, the present invention can use the ripple cancellation circuit 602 to execute Step 902 and use the compensation voltage generation circuit 604 to execute Step 904. In Step 902, as shown in FIG. 8, during the turning-on of the power switch 104, the ripple cancellation circuit 602 first uses the current IUP flowing through the feedback pin 208 of the primary controller 200 to generate the regulation current ILRC, and further uses the resistor 6022 and the regulation current ILRC to determine the regulation voltage VLRC (that is, the adjustment), wherein as shown in FIG. 5, when the DC voltage VBUCK is greater than the ripple cancellation reference voltage VLIMIT, the regulation current ILRC is positively changed with the DC voltage VBUCK, and because the resistor 6022 and the regulation current ILRC can determine the regulation voltage VLRC, the regulation voltage VLRC is also positively changed with the DC voltage VBUCK.

In Step 904, as shown in FIG. 7, the adder 2046 of the compensation voltage generation circuit 604 can generate the adjusted reference voltage AVREF according to the regulation voltage VLRC and the reference voltage VREF, wherein the adjusted reference voltage AVREF is equal to the reference voltage VREF minus the regulation voltage VLRC. That is to say, the adjusted reference voltage AVREF is less than the reference voltage VREF. Because the adjusted reference voltage AVREF is less than the reference voltage VREF, the compensation voltage VCOMP generated by the error amplifier 2044 according to the adjusted reference voltage AVREF and the sample voltage VH can be decreased.

In Step 906, as shown in FIG. 7, because the compensation voltage VCOMP is decreased, the turning-on time of the gate control signal GCS generated by the gate control signal generation circuit 206 is decreased (that is, the duty cycle of the gate control signal GCS is decreased), resulting in the output voltage VOUT of the secondary side SEC of the power converter 100 being decreased. That is to say, as shown in FIG. 7, when the DC voltage VBUCK is greater than the reference voltage VLIMIT, the ripple cancellation circuit 602 can generate the regulation voltage VLRC according to the regulation current ILRC to make the error amplifier 2044 receive the smaller reference voltage (that is, the adjusted reference voltage AVREF), so the compensation voltage VCOMP generated by the compensation voltage generation circuit 604 can be decreased, resulting in the turning-on time of the gate control signal GCS generated by gate control signal generation circuit 206 being decreased to reduce the output voltage VOUT of the secondary side SEC of the power converter 100.

To sum up, the primary controller and the operational method utilize the ripple cancellation circuit to generate the adjustment according to the current flowing through the feedback pin of the primary controller during the turning-on of the power switch of the primary side of the power converter when the input voltage of the primary side of the power converter is greater than the ripple cancellation reference voltage, utilize the compensation voltage generation circuit to generate the compensation voltage of the compensation pin according to the adjustment, the reference voltage, and the feedback voltage of the feedback pin, and utilize the gate control signal generation circuit to generate the gate control signal to the power switch according to the compensation voltage and the detection voltage to reduce the output voltage of the secondary side of the power converter. Therefore, compared to the prior art, when the power converter operates in the quasi-resonant mode, or the continuous-conduction mode, or the discontinuous-conduction mode, the present invention can suppress the ripple of the output voltage of the secondary side of the power converter under the DC voltage of the primary side of the power converter being gradually decreased and the load of the secondary side of the power converter being very large.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A primary controller applied to a primary side of a power converter, wherein an alternating current (AC) voltage inputted in the power converter is rectified by a bridge rectifier of the primary side of the power converter to generate a direct (DC) voltage and the primary controller comprises a ripple cancellation function, the primary controller comprising:

a ripple cancellation circuit for generating an adjustment according to a current flowing through a feedback pin of the primary controller during turning-on of a power switch of the primary side of the power converter, wherein the ripple cancellation circuit generates the current flowing to the feedback pin corresponding to the DC voltage;

a compensation voltage generation circuit coupled to the ripple cancellation circuit, the feedback pin, and a compensation pin of the primary controller for generating a compensation voltage of the compensation pin according to the adjustment, a reference voltage, and a feedback voltage of the feedback pin;

a gate control signal generation circuit coupled to the compensation voltage generation circuit and the compensation pin for generating a gate control signal to the power switch to reduce an output voltage of a secondary side of the power converter according to the compensation voltage and a detection voltage.

2. The primary controller of claim 1, wherein the power converter is a flyback power converter.

3. The primary controller of claim 1, wherein the adjustment is a regulation current or a regulation voltage.

4. The primary controller of claim 1, wherein the feedback pin is coupled to an auxiliary winding of the primary side of the power converter.

5. The primary controller of claim 4, wherein the current corresponds to an auxiliary voltage of the auxiliary winding of the primary side of the power converter and the feedback voltage, and flows from an inner of the primary controller to the auxiliary winding through the feedback pin of the primary controller.

6. The primary controller of claim 5, wherein the auxiliary voltage corresponds to a direct current (DC) voltage of the primary side of the power converter and a turns ratio, and the turns ratio is a ratio of turns of a primary winding of the primary controller to turns of the auxiliary winding.

7. The primary controller of claim 1, wherein the compensation voltage is used for adjusting a duty cycle of the gate control signal to reduce the output voltage of the secondary side of the power converter.

8. The primary controller of claim 1, wherein during the turning-on of the power switch of the primary side of the power converter, when an input voltage of the primary side of the power converter is greater than a ripple cancellation reference voltage, the ripple cancellation circuit generates the adjustment according to the current.

9. The primary controller of claim 1, wherein the detection voltage is determined by a primary-side current flowing through the power switch and a detection resistor, and the detection resistor is coupled to the power switch.

10. The primary controller of claim 1, wherein the compensation voltage generation circuit comprises:

a sample-and-hold circuit coupled to the ripple cancellation circuit and the feedback pin for sampling the feedback voltage to generate a sample voltage; and an error amplifier coupled to the sample-and-hold circuit for generating the compensation voltage of the compensation pin according to the reference voltage and the sample voltage.

11. An operational method applied to a primary controller of a primary side of a power converter, wherein the primary controller comprises a ripple cancellation circuit, a compensation voltage generation circuit, and a gate control signal generation circuit, and has a ripple cancellation function, wherein an alternating current (AC) voltage inputted in the power converter is rectified by a bridge rectifier of the primary side of the power converter to generate a direct (DC) voltage, the operational method comprising:

generating an adjustment according to a current flowing through a feedback pin of the primary controller during turning-on of a power switch of the primary side of the power converter, wherein the ripple cancellation circuit generates the current flowing to the feedback pin corresponding to the DC voltage;

generating a compensation voltage of the compensation pin by the compensation voltage generation circuit according to the adjustment, a reference voltage, and a feedback voltage of the feedback pin; and generating a gate control signal to the power switch by the gate control signal generation circuit to reduce an output voltage of a secondary side of the power converter according to the compensation voltage and a detection voltage.

12. The primary controller of claim 11, wherein the adjustment is a regulation current or a regulation voltage.

13. The primary controller of claim 11, wherein the current corresponds to an auxiliary voltage of an auxiliary winding of the primary side of the power converter and the feedback voltage and flows from an inner of the primary controller to the auxiliary winding through the feedback pin of the primary controller.

14. The primary controller of claim 13, wherein the auxiliary voltage corresponds to a direct current (DC) voltage of the primary side of the power converter and a turns ratio, and the turns ratio is a ratio of turns of a primary winding of the primary controller to turns of the auxiliary winding.

15. The primary controller of claim 11, wherein the compensation voltage is used for adjusting a duty cycle of the gate control signal to reduce the output voltage of the secondary side of the power converter.

16. The primary controller of claim 11, wherein during the turning-on of the power switch of the primary side of the power converter, when an input voltage of the primary side of the power converter is greater than a ripple cancellation reference voltage, the ripple cancellation circuit generates the adjustment according to the current.

17. The primary controller of claim 11, wherein the detection voltage is determined by a primary-side current flowing through the power switch and a detection resistor, and the detection resistor is coupled to the power switch.

* * * * *